March 21, 1967 — N. SAMA — 3,310,269
BUOYANT BODY HOLDER FOR A TANK
Filed Aug. 3, 1966

INVENTOR.
NICHOLAS SAMA
BY John Cyril Malloy
ATTORNEY.

United States Patent Office 3,310,269
Patented Mar. 21, 1967

3,310,269
BUOYANT BODY HOLDER FOR A TANK
Nicholas Sama, 5591 SW. 76th St., Miami, Fla. 33143
Filed Aug. 3, 1966, Ser. No. 570,028
6 Claims. (Cl. 248—205)

This invention relates to a buoyant body holder for a tank and, more particularly, this invention relates to a buoyant body holder for a tank which includes a plate or layer member having means mounted thereon to connect a thermometer thereto with the plate being arranged so that it extends above the float line of the body.

As is perhaps well known, as in the case of fish aquariums, there is a problem in positioning a thermometer within a tank holding a liquid so that it may be observed at all times. For instance, the water level changes as the water evaporates in an aquarium. Also, currents may cause float type thermometer to move into an unfavorable orientation so that the reading cannot be readily observed. This is inconvenient to an observer. The instant invention provides a device which is adapted to overlay a portion of the tank wall and by reason of forces of adhesivity maintain orientation of an indicator device at about the float line of the device which is encapsulated in a buoyant body.

It is accordingly an object of this invention to provide a buoyant body holder for a tank which includes in addition to the buoyant body, a layer member to overlay a portion of the side wall of the tank and means on the layer member to hold the buoyant body with the float line thereof such that a portion of the layer member extends above the float line of the buoyant body and is of an area adapted to overlie a sufficient area of the tank wall so that a thin film of liquid in the tank captivated between the layer and the wall surface will cause forces of adhesivity to maintain the composite body against lateral movement relative to the tank side wall while the buoyant body is supported vertically by the buoyancy of the liquid.

It is another object of this invention to provide a buoyant body holder for a tank which is simple in construction, inexpensive to manufacture, and is adapted to hold an indicator device in a predetermined position relative to a side wall of a tank so that it may be readily observed.

In accordance with these and other objects which will become apparent hereinafter, the instant invention will now be described with reference to the accompanying drawings illustrating a preferred embodiment thereof.

Figure 1:
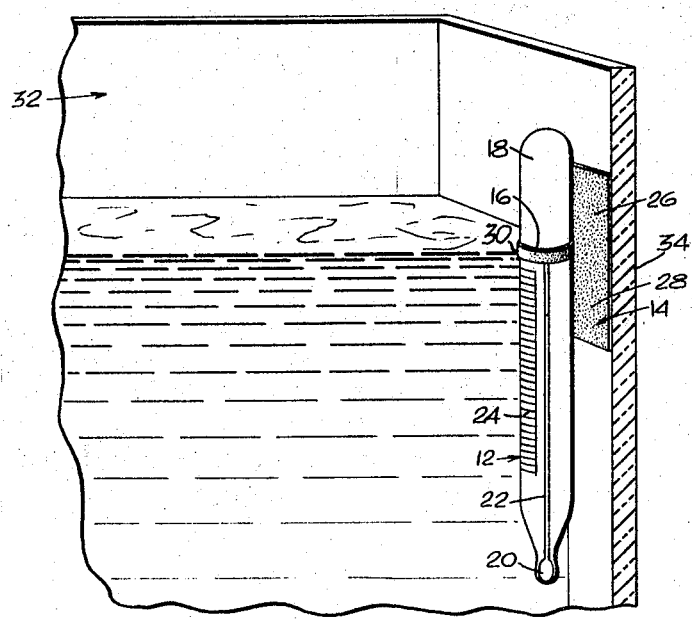
FIGURE 1 is a perspective view of a side wall of a tank which is partly broken away and which illustrates the buoyant body holder.
Figure 2:
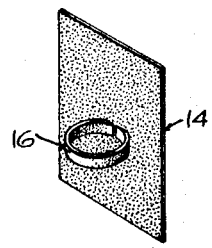
FIGURE 2 is a perspective view of the buoyant body holder with the buoyant body removed therefrom.
Figure 3:
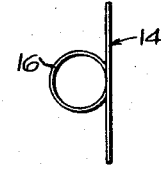
FIGURE 3 is a plan view of the holder of FIGURE 2.

Referring particularly in the drawings to FIG. 1, there is shown, in combination, a thermometer designated by the numeral 12 and, attached to the thermometer, a plate 14. The means for attaching the plate to the thermometer may comprise a ring 16 on the plate sized to snugly but slidingly accommodate the cross-sectional area of the thermometer. The thermometer comprises a buoyant body 18 having a lower portion which comprises a reservoir 20 to hold a supply of a thermometric substance. A capillary tube 22 is provided to communicate at one end with the thermometric substance, and it is arranged to extend upwardly through the body 18 of the thermometer so that as the temperature of the thermometric material varies, the said thermometric material rises to varying heights in the capillary tube depending upon the temperature. A scale 24 is provided in the buoyant body and arranged adjacent the capillary tube. The scale carries various grade marks to indicate the temperature at which the substance is presently being maintained. The plate 14 is preferably of thin, flexible material and is preferably in abutting relation to the exterior surface of the buoyant body and arranged such that a portion of the plate is above the float line 30 of the thermometer, which is the intersection of the water in the tank 32 and the buoyant body and said plate or layer preferably includes a portion extending at least below the float line of the thermometer.

The plate, when connected to the thermometer, or any other buoyant body, will hold the buoyant body in a predetermined position with respect to the side wall 34 of the tank. The operation of the device being such that when the plate is connected to the buoyant body such that there is a portion indicated by the numeral 26 above the float line and as shown a portion 28 extending below the float line and the combination of the buoyant body and the plate are moved such that a portion of the plate engages the side wall, the surface tension of the liquid in the tank will attract the entire plate into main face or main surface abutting relation with the wall captivating therebetween a thin film of the liquid which by reason of an adhesivity effect or phenomenon will serve to produce a small but significant force of sufficient magnitude to maintain the buoyant body, which is supported by its own buoyancy, in a given orientation with respect to the plate and resist movement across the surface of the water. It is preferred that at least a portion of the plate extend below the float line for the reason that this serves to communicate and encourage the flow of the thin film into captivation between the plate and the side wall of the tank and to suck up and thereby supply losses due to evaporation from the edges of the film.

As the main surface of the liquid in the tank evaporates and, consequently, the water level or the liquid level decreases, the device will remain in position until such time as the loss of buoyancy and, consequently, the increased effect of the weight of the device will overcome the adhesivity effect aforesaid, and the device will slide on the film to a new equilibrium position and in this manner remain at all times attached to the wall and in the predetermined orientation. Conversely, the same effect will be noted if the liquid level is raised and the buoyant body by reason of the forces of buoyancy is raised relative to the side wall of the tank.

While the instant embodiment has been shown in a preferred environment, that of a fish aquarium, it is recognized that devices other than thermometers may be supported and comprise the buoyant body and that the same may be utilized in oil tanks or the like.

While the instant invention has been shown and described herein in what is conceived to be the most practical and preferred embodiment, it is recognized that departures may be made therfrom within the scope of the invention, which is therefore not to be limited to the details disclosed herein but is to be accorded the full scope of the claims so as to embrace any and all equivalent apparatus and articles.

What is claimed is:
1. In combination:
   (a) a buoyant body to be removably affixed in a predetermined position and orientation with respect to the side wall of a tank holding a liquid in which said body is buoyant;
   (b) a layer member to overlay a portion of the side wall of the tank; and
   (c) means on the layer member to connect said member to the buoyant body such that a portion of the member is above the float line of the buoyant body and a portion of the member is at or below the float line of the buoyant body;

the area of the member to overlay the side wall of the tank above said float line being of an area such that:
(1) when said means connect the member to the buoyant body,
(2) when the member is in an overlaying relation on the tank wall, and
(3) when a thin film of said liquid is captivated between the layer member and the wall surface,
the forces of adhesion caused by a thin film of said liquid captivated between the member and the side wall of the tank will be such that the composite body will be held against lateral movement relative to the tank side wall and the buoyant body will be supported vertically the by the buoyancy of the liquid.

2. The combination as set forth in the foregoing claim 1 wherein no portion of the member extends below the float line.

3. A device as set forth in claim 2 wherein the said member is of a thin flexible material in plate form and bendable so that it will conform by reason of the forces of adhesivity and surface tension into an abutting intimate face-to-face relation with the side wall of the tank.

4. A device as set forth in claim 3 wherein the means to connect the buoyant body and the plate permit of adjustment of the buoyant body relative to the plate to compensate for the float line of the device to be held and to permit of orientation of a scale carried in the buoyant body 5. A device as set forth in claim 1 wherein the said member is of thin flexible material of planiform.

6. A device as set forth in claim 5 wherein the said member extends below the float line.

No references cited.

CLAUDE A. LE ROY, *Primary Examiner*.